Aug. 29, 1967  N. G. KLING  3,338,207
AUTOMATIC IMMERSION APPARATUS
Filed Feb. 3, 1965  4 Sheets-Sheet 1
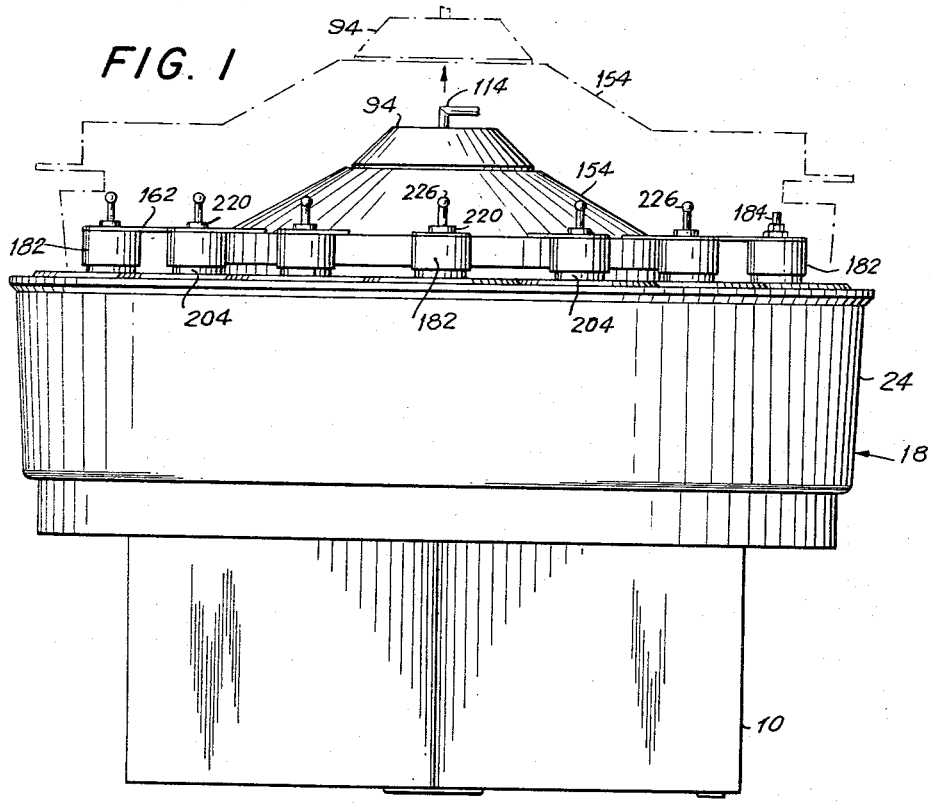
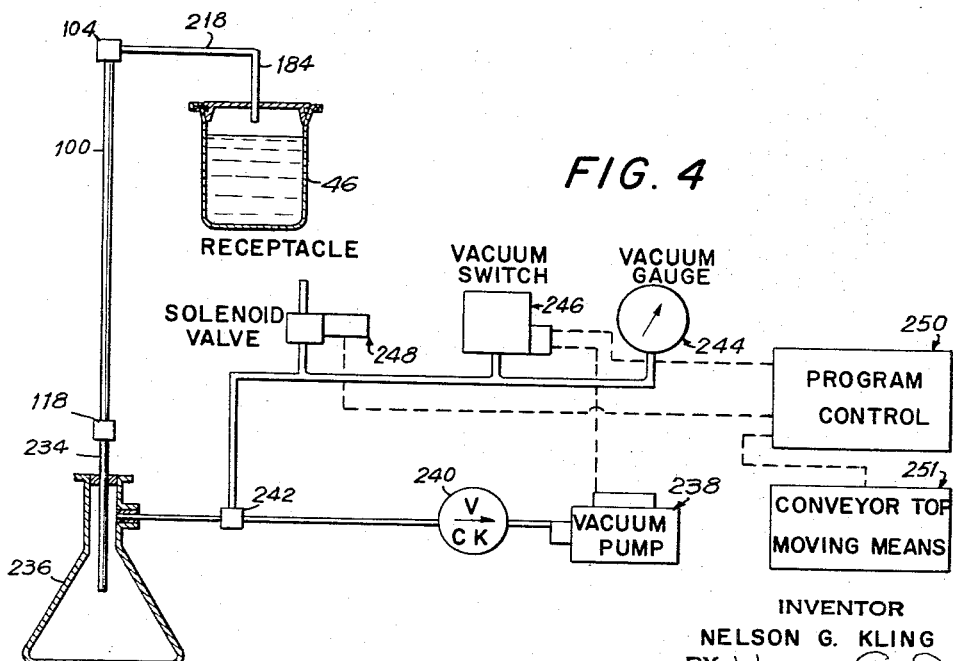
INVENTOR
NELSON G. KLING
BY
ATTORNEY

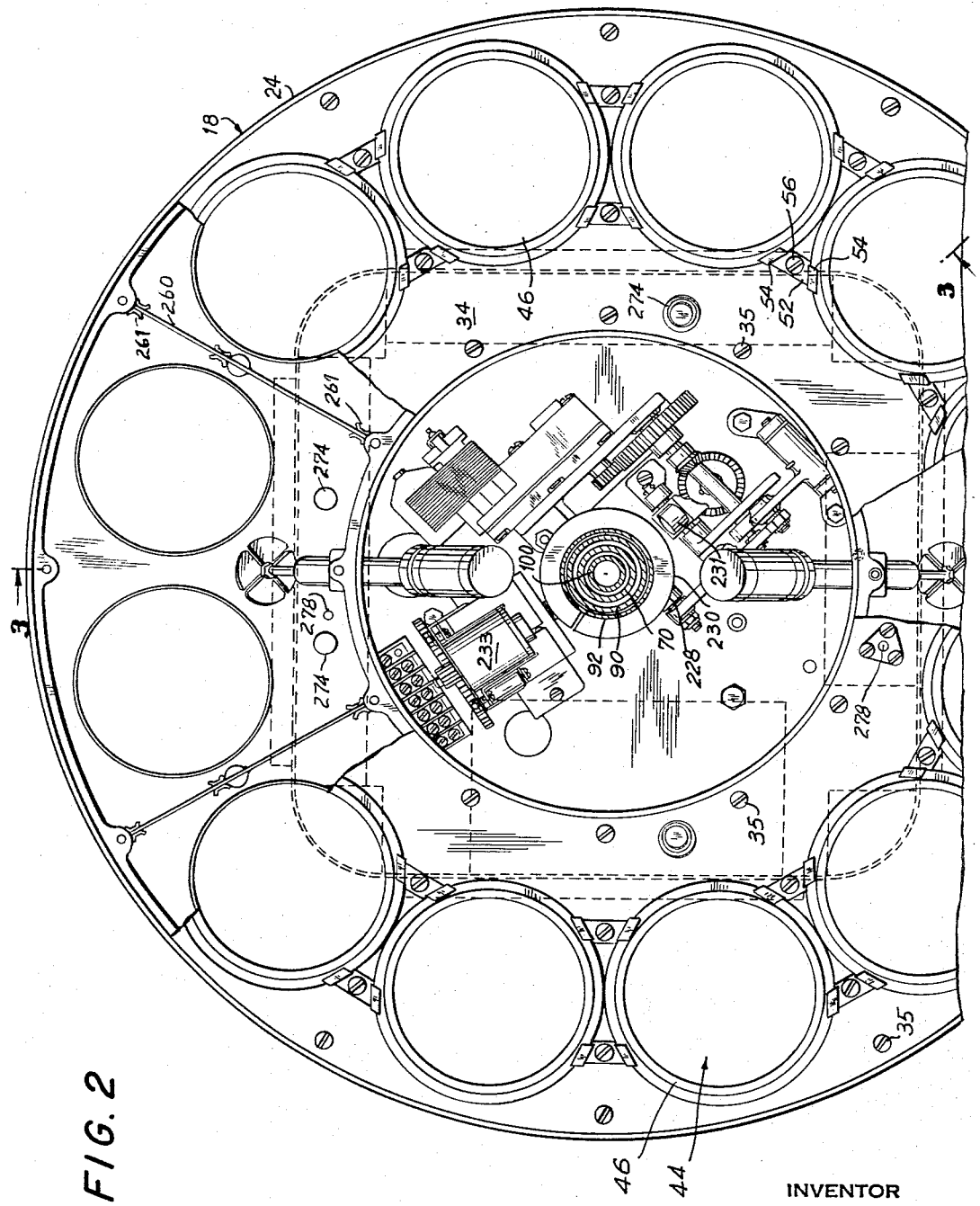

Aug. 29, 1967
N. G. KLING
3,338,207
AUTOMATIC IMMERSION APPARATUS
Filed Feb. 3, 1965
4 Sheets-Sheet 3
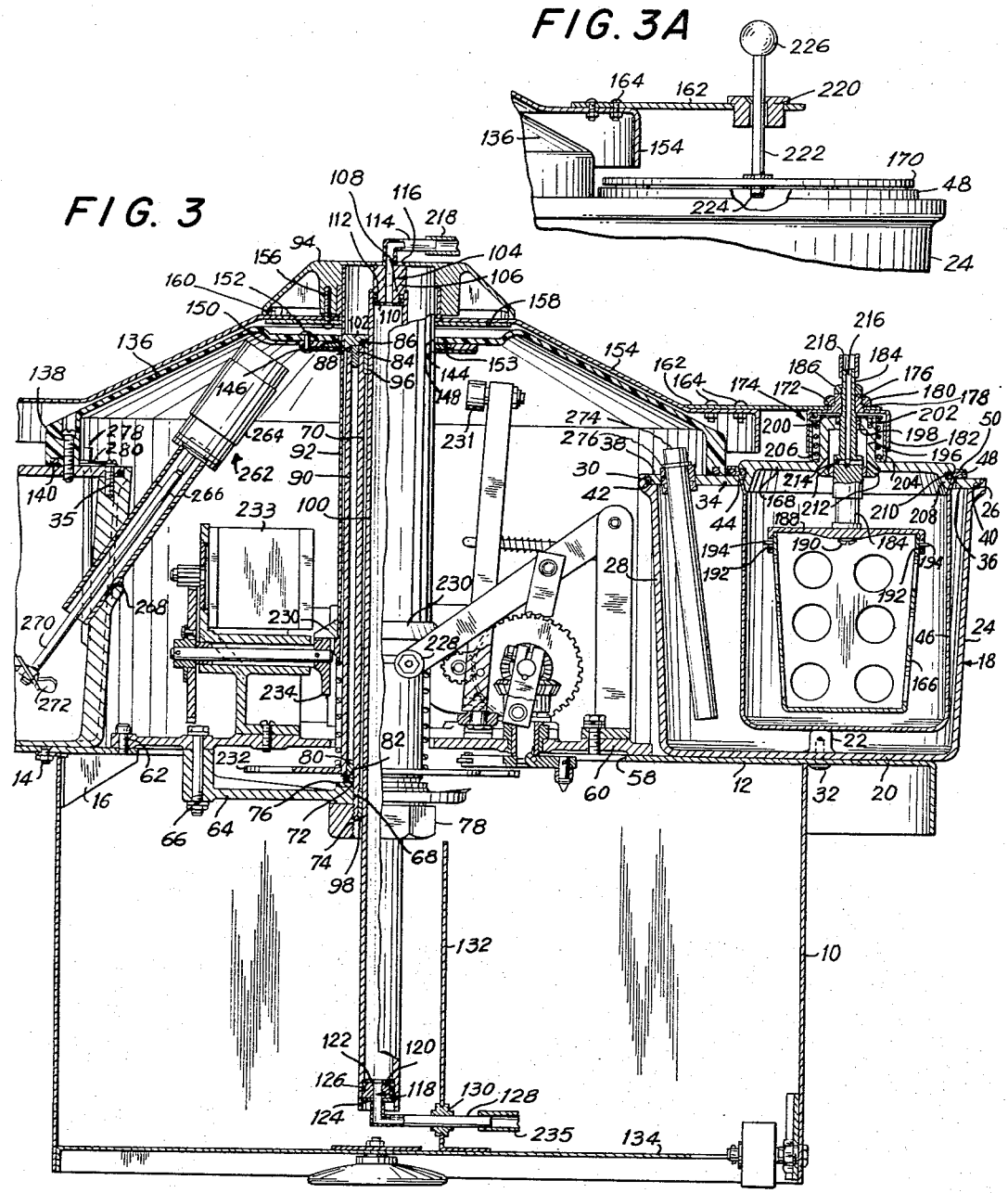
INVENTOR
NELSON G. KLING
BY
ATTORNEY

INVENTOR.
NELSON G. KLING
BY
ATTORNEY

United States Patent Office 3,338,207
Patented Aug. 29, 1967

3,338,207
AUTOMATIC IMMERSION APPARATUS
Nelson G. Kling, Ringwood, N.J., assignor, by mesne assignments, to Technicon Corporation, a corporation of New York
Filed Feb. 3, 1965, Ser. No. 430,154
11 Claims. (Cl. 118—11)

This invention relates to the treatment of animal tissue by a series of liquids and, more particularly, to the treatment of animal tissue in preparation for the microscopic examination thereof.

Apparatuses for sequentially immersing tissue in different liquids are well known. In most of these apparatuses the tissue is placed in a perforate receptacle which is hung from a boom on a mast and is sequentially disposed for variable periods of time in different beakers, which contain different treating liquids. The liquids may comprise, for example, the following: fixative, wash, dehydrant, clearant and paraffin. The total time for this procedure customarily requires sixteen hours for a specimen of eight millimeters gross thickness.

It is an object of this invention to provide an apparatus for shortening the time required to process such tissue, while improving the preservation of the details of the tissue and cellular morphology.

A feature of this invention is the provision of an immersion apparatus having a plurality of beakers, each for containing a treating liquid, each for being maintained under a predetermined temperature, and means for maintaining the tissue in each such beaker under a vacuum.

These and other objects, features and advantages of this invention will be fully understood from the following description considered in connection with the accompanying illustrative drawings of the presently preferred embodiment of this invention, in which:

FIG. 1 is a side view in elevation of an automatic immersion apparatus embodying this invention;

FIG. 2 is a plan view in partial cross-section of the apparatus of FIG. 1;

FIG. 3 is a side view in elevation of the apparatus taken along plane 3—3 of FIG. 2;

FIG. 3A is a detail of the apparatus of FIG. 3;

FIG. 4 is a diagrammatic view of the vacuum system of the apparatus; and

Figure 5:
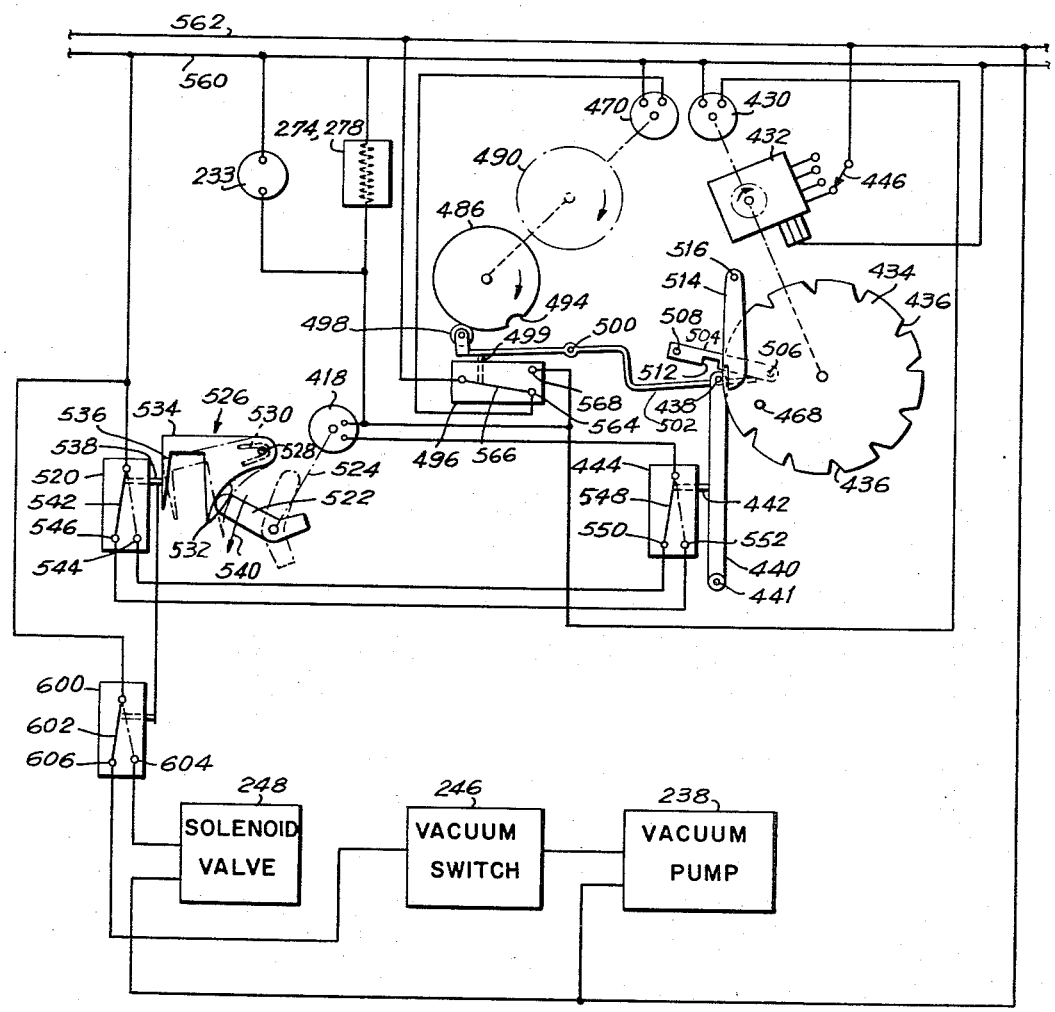
FIG. 5 is a diagrammatic view of the electrical system of the apparatus.

In the drawings, the automatic immersion apparatus embodying the present invention comprises a cabinet 10 on which a table 12 is mounted by suitable nuts and bolts 14, and lugs 16. A circular, open topped trough 18 having a bottom 20, a plurality of inwardly, upwardly projecting bosses 22, an outer sidewall 24 having an upper, offset shoulder 26, and an inner sidewall 28 having an upper offset shoulder 30, is mounted to the table 12 by suitable bolts 32 passing through the table into the bosses 22. An annular cover plate 34 is fitted over the trough 18, and secured thereto by suitable bolts 35, its outer peripheral edge 36 resting on the shoulder 26 and its inner peripheral edge 38 resting on the shoulder 30. A gasket 40 is disposed in two opposed recesses respectively in the edge 36 and the shoulder 26, and a gasket 42 is disposed in two opposed recesses respectively in the edge 38 and the shoulder 30, to seal these joints. The cover plate has a plurality of equally spaced apart apertures 44 therein. A plurality of receptacles 46 are respectively disposed in these apertures. Each receptacle is advantageously formed of a thin gage metal such as stainless steel or a thin gage plastic and has a turned over lip 48 with an O-ring 50 therein. The edge of the lip and the O-ring rest on the upper surface of the cover plate 34. Each of the receptacles is held securely in place by a plurality of retaining brackets 52; each bracket having a bent-up end 54 overlying the lip 48 of a receptacle, and secured to the cover plate 34 by a suitable bolt 56.

The table 12 includes a central aperture 58. An annular member 60 overlies the aperture 58 and is secured to the table 12 by a plurality of bolts 62. A stationary support bracket 64 depends from the annular member 60 and is fixed thereto by a plurality of bolts and nuts 66. The bracket 64 has a central aperture 68 into which a tube 70 is disposed. The tube 70 is reduced in thickness at its lower end portion to form an external shoulder 72 and an externally threaded lowermost portion 74. The shoulder 72 rests on a washer 76 which rests on the upper surface of the bracket 64, and an internally threaded collar or nut 78 engages the tube threaded portion 74 to clamp the tube 70 to the bracket 64.

A lower collar or ring 80 is disposed on the tube 70, rests on the washer 76 and has an external shoulder 82. An upper collar or ring 84 is disposed on the tube 70, is precluded from upward movement by a snap-ring 86 mounted in an external groove in the upper end of the tube 70 which overhangs the upper surface of the collar, and has an external shoulder 88. A stationary tube 90 is telescoped over the tube 70 and clamped at the ends between the two shoulders 82 and 88 of the two collars 80 and 84 respectively. A movable tube 92 is telescoped over the stationary tube 90 for relative up and down, and rotational movement. A cap member 94 is fixed to and over the upper end of the movable tube 92. The stationary tube 70 has an internal upper shoulder into which a bearing sleeve 96 is fixed, and an internal lower shoulder into which a bearing sleeve 98 is fixed. A movable tube 100 is telescoped within the stationary tube 70 and the two bearings 96 and 98. The movable tube 100 is fixed to, for movement with, the movable tube 92 by an annular element 102.

An upper plug type air fitting 104 has a body portion 106 secured between the cap member 94 and the upper end of the movable tube 100. The lower end portion 108 of this body portion is wedged into the upper end of the tube 100. The tube 100 has a reduced thickness to provide an internal shoulder on which a washer 110 rests to limit the insertion of the fitting end portion 108 into the tube 100. A gasket 112 is disposed between the end portion 108 and the tube 100 to seal this joint. The fitting also has a nipple portion 114 which extends up through an aperture 116 in the cap member. A lower plug type air fitting 118 has a body portion 120 wedged into the lower end of the tube 100. The tube 100 has a reduced thickness to provide an internal shoulder against which a washer 122 is pressed by the fitting to limit the insertion of the fitting into the tube. A snap ring 124 is disposed in an internal groove in the tube 100 to retain the fitting therein. A gasket 126 is disposed between the body portion 120 and the tube to seal this joint. The fitting also has a nipple portion 128 which extends below the tube 100 radially therefrom. The nipple portion is disposed through a fitting 130 which is free to slide up and down on a guide 132 which is fixed to and stands up from a bottom plate 134 which closes the underside of the cabinet 10.

A dome shaped cover 136 is fixed over the central aperture of the cover plate 34 and is fixed thereto by a plurality of suitable bolts 138. An O ring 140 is disposed in a groove in the edge of the cover 136 to seal the joint between the cover 136 and the cover plate 34. The cover has a central aperture 144 through which the tube 92 is disposed. A disk 146 has a central aperture 148, which also passes the tube 92, and is fixed by an annular spacer 150 and a plurality of rivets 152 to the cover 136. An oiled porous material 153 is disposed between the dish 146 and the cover 136 to close the gap to the outer surface. A dome shaped conveyor top 154 is fixed to the underside of the cap member 94 by suitable bolts 156 which pass through a lower stiffening disk 158, the conveyor top 154, an upper stiffening member 160, and into the cap member 94. A plurality of brackets 162 are fixed, by suitable bolts and nuts 164, at angular intervals, so that one such bracket overlies each receptacle 46. These brackets serve to support at least one perforated container 166 for immersing tissue into fluid disposed in a receptacle, a cover 168 for sealing that receptacle, and a plurality of covers 170 for covering the other receptacles. The end of each bracket 162 has an aperture 172 therethrough. The bracket supporting the perforate container is shown in the right hand portion of FIG. 3. A first cup member 174 has a tubular body portion 176 which is disposed through the aperture 172, has an external shoulder 178 and is externally threaded thereabove to receive a nut 180 which rests on the shoulder 178. This nut is spaced slightly from the bracket by the shoulder and permits the cup member to rotate with respect to the bracket. The body portion 176 extends into a downwardly turned flange portion 182. A rod member 184 has an upper portion of reduced diameter forming an external shoulder and is threaded thereabove, and is disposed through the body portion 176 and secured thereto by a nut 186 on the external shoulder. The lower end of the rod member 184 has a bracket 188 secured thereto by a suitable bolt 190. This bracket is provided with two apertures 192 in which two laterally projecting pins 194 carried by the container 166 are removably engaged. The ends of the bracket have sufficient resiliency to permit their springing over these pins for connecting and disconnecting the container to and from the bracket. The cover 168 includes a central, cup-shaped portion 196 which is disposed within the flanged portion 182 and has a central aperture through which the upper end of the rod member 184 is passed. An O ring 198 is disposed between the rod member and the cup-shaped portion and compressed by a washer 200, which is fastened to the cup-shaped portion by suitable bolts 202, to seal the joint between the rod member 184 and the cover 168 while permitting relative movement therebetween. A second cup shaped member 204 having an up-turned flange portion and a central aperture is disposed over the cup shaped portion 196 and within the downturned flange portion 182. A helical spring 206 is disposed laterally between the cup shaped portion 196 and the up-turned flange portion 204, and longitudinally between the upper portion of the flange portion 182 and the lower portion of the flange portion 204 to bias the cover 168 downwardly from the bracket 162. The cover 165 includes an annular lip portion 208 which is disposed in part within the top of the receptacle 46 and carries an O ring 210 to seal the cover to the receptacle. Four passageways 212 are bored within the cover to insure the free flow of air from the receptacle to the space within the cup shaped portion 196. The rod member 184 has two diametrical bores 214 therethrough and a longitudinal bore 216 extending from the intersection of the diametrical bores to the upper end of the rod member. A flexible tube 218 is connected at one end thereof to the upper end of the rod member 184 and at its other end to the nipple portion 114. By this arrangement, when the cover 168 is disposed over a receptacle 46, the interior of such receptacle is coupled by an airtight conduit consisting of the bores 212, the bores 214, the bore 216, the tube 218, the nipple portion 114, the air fitting 104, the tube 100, and the air fitting 118, to the nipple portion 128. The nipple portion is coupled to a vacuum pump and valve assembly which will be subsequently discussed with reference to FIG. 4.

The other brackets 162 have a tubular fitting 220 snapped therein. A rod 222 is freely slidable therethrough and carries the cover 170 fixed thereto at its lower end by a suitable bolt 224, and an enlarged element 226 at its upper end. The cover 170 is adapted to overlie the top of the respective receptacle 46 to minimize evaporation therefrom.

Mechanism is provided on the annular member 60 to intermittently raise the assembly including the conveyor top 154 and its associated brackets 162, covers 168 and 170, and the perforated container 166, to rotate the assembly, and to lower the assembly, so that the container 166 is disposed in the next adjacent receptacle 46. This mechanism is described and shown in detail in the patent to Isreeli, U.S. 2,872,894, issued Feb. 10, 1959, which disclosure is incorporated herein. Briefly described, a linkage assembly raises a roller 228 which engages the under face of an annular cam follower 230 which is fixed to the tube 92, to raise the conveyor top 154 and the perforated container 166. When the conveyor top is raised, the linkage interposes a roller 231 to support the cam follower 230. An intermittently driven member 232 is secured to the tube 90 which is laterally coupled to the tube 92 by a key and keyway (not shown) for conjunct rotation; so that the perforated container is shifted from over the preceding receptacle 46 to the succeeding receptacle. The linkage now withdraws the roller 231 and lowers the roller 228, lowering the conveyor top and disposing the perforated container in the succeeding receptacle. While the perforated container is disposed in a receptacle, a motor 233 drives a cam 234 which engages the under face of the cam follower 230 and oscillates the tube 92 up and down a small distance. This oscillation is transmitted by the conveyor top 154 to the rod member 184 and thence to the perforated receptacle 166. This small oscillation, however, does not disturb the seal between the cover 168 and the top of the receptacle 46, and is absorbed by the helical spring 206.

When the assembly is rotated by the member 232, the nipple portion 128 is constrained by the fitting 130, and thus the air fitting 118 rotates with respect to the tube 100. When the assembly is elevated or lowered by the roller 228 the fitting moves along the guide 132 and the air fitting 118 moves with the tube 100. As shown in FIG. 4, the air fitting 118 has its nipple fitting 128 coupled by a conduit 235 into a sump 236. A vacuum pump 238 is coupled through a check valve 240 and a three-legged fitting 242 to the sump 236. The inlet towards the vacuum pump at the sump is above the outlet of the conduit 234, so that any liquid from the conduit 234 will be dropped in the sump. A vacuum gauge 244, a vacuum switch 246 and a solenoid valve 248 are coupled to the third leg of the three-legged fitting 242. The vacuum gauge provides a visual indication to the operator of the vacuum developed on the system. The vacuum switch is electrically coupled to the vacuum pump to cause the pump to maintain a desired vacuum in the system. The solenoid switch is coupled to the atmosphere to release the vacuum in the system before the conveyor top and the perforated container are raised. A program control 250 is coupled to the solenoid valve to cause it to open the system to the atmosphere for a short interval of time, is coupled to the conveyor top moving means 251 to cause it next to raise, rotate and lower the conveyor top, and is coupled to the vacuum pump to cause it finally to provide a vacuum in the system.

The program control mechanism is similar to that shown in the U.S. patent application of Nelson G. Kling, S.N. 410,597, filed Nov. 12, 1964, and assigned to the assignee of this application; which application is incorporated herein by reference as shown in FIG. 5. The apparatus includes a motor 418 operating the mechanism for moving the conveyor top 156. Motor 418 operates under the control of the program mechanism 250.

The program control mechanism 250 includes a constant speed motor 430 which drives a gear transmission 432 which in turn drives a cam 434. The cam has a plurality of dwells 436 about its periphery which will receive a pin 438 passing through a slot in the panel of the cabinet 10 and fixed to the distal end of arm 440 which is pivoted at 441. The distal end of the arm 440 is biased towards the cam by the actuator 442 of a snap action switch 444. The gear transmission is operated by relays mounted within the housing of the transmission, one of which is energized by a selector switch 446, to cause the cam 434 to be rotated at 2, 4, 8 or 16 hours per revolution. A pin 468 stands up from the cam 434.

A second constant speed motor 470 has an output shaft to which a cam 486 is coupled by a gear 490. The cam 486 has a single dwell 494. A snap action switch 496 has a follower-arm 498 which is biased by the switch actuator 499 to ride on the cam 486. The speed of the motor 470 and the ratios of the gears 476 and 490 are arranged so that the cam rotates at the rate of 72 hours per revolution.

The follower-arm 498 is pivoted at 500 and includes an extension arm 502. An arm 504 is pivotally mounted at one end at 506 behind the panel and has an upstanding pin 508 at its distal end which passes forwardly through a slot in the panel. The distal end of arm 502 normally engages and elevates the lower edge of the arm 504 when the follower 498 is riding on the rise of the cam 486. When the follower 498 centers the dwell 494 of the cam 486 it permits the arm 504 to fall. The lower edge of the arm 104 includes a cut-out or notch 512. When the follower 498 enters the dwell 494, and the arm 502 releases the arm 504, the arm 504 falls until its lower edge is supported by the pin 438. An arm 514 is pivotally mounted on the front of the panel at 516, with its distal end adjacent the pin 438. The pin 438 is free to enter the notches 436 without abutting the arm 514. However, when the cam 434 carrying the upstanding pin 468 has rotated sufficiently, the pin 468 will abut the lower right rounded end of the arm 516, camming the arm 516 clockwise to abut the pin 438, shifting the pin leftwardly along the lower edge of the arm 504, until the pin 438 is below the notch 512. When the arm 504 is not otherwise supported by the arm 502 it falls, capturing the pin 438 in the notch 512, and thereby preventing the pin 438 from subsequently entering any notch 436.

The operation of the conveyor motor 418 is controlled by the snap-action switches 496, 444 and 520. The state of the snap action switch 520 is dependent on the operation of the conveyor mechanism by the motor 418. For example, the motor 418 drives a cam member 522 by means of a linkage 524. The cam member 522 cooperates with a switch operator 526 which is pivotally mounted at 528. The switch opertaor is biased by a spring 530 to rotate counter-clockwise. The switch operator is provided with a cam face portion 532 and with an arm portion 534 which extends outwardly and away from the cam face portion and which arm has a depending portion 536 for operating the actuator 538 of the snap action switch 520. The cam member 522 is operated counter-clockwise as indicated by the arrow 540, to first pivot the switch operator 526 clockwise to operate the actuator 538 so that a movable contact 542 is moved from a fixed contact 544 to a fixed contact 546. The continued travel of the member 522 along the cam face portion 532 permits the switch operator 526 to return under the bias of the spring 530 to restore the movable contact 542 to the fixed contact 544.

The state of switch 444 is dependent on whether the pin 438 (1) rides on the periphery of the timing disk 434, (2) falls in a timing dwell 436, or (3) is captured by the notch 512 of the arm 504 as a result of the abutment of the arm 514 by the pin 468.

When the pin 438 rides on the periphery of the disk 434, the arm 440 operates the actuator 442 so that a movable contact 548 is moved to a fixed contact 550, which is connected to the contact 544. When the pin 438 falls into a dwell 436, the arm 440 releases the actuator so that the movable contact 548 is moved to a fixed contact 552, which is connected to the contact 546. When the pin 538 is captured by the notch 512, the movable contact 548 is moved to the fixed contact 550.

The system is energized by a pair of power lines 560 and 562. The delay timer motor 470 has one terminal connected to the line 560 and its other terminal connected to a fixed contact 564 of the snap action switch 496, which has a movable contact 566 and another fixed contact 568. The movable contact 566 is connected to the line 562. When the follower 498 is on the rise of the cam 486 the movable contact 566 is moved to the fixed contact 564, and thus the motor 470 is energized. The program timer motor 430 has one terminal connected to the line 560 and its other terminal connected to the fixed contact 568 of the snap action switch 496. When the follower 498 enters the dwell 494 of the cam 486 at the end of the delay interval the movable contact 566 is moved from the fixed contact 564 to the fixed contact 568. The delay motor 470 is thus de-energized, and the program motor 430 is energized. The thermostats 278 and heaters 294 have one terminal connected to the line 160 and another terminal coupled to the fixed contact 168. The motor 233 for oscillating the tissue container 166 when it is immersed in a processing liquid has one terminal connected to the line 460 and its other terminal coupled to the fixed contact 568. Thus when the program motor 430 is energized, the heaters and the motor 233 are also energized. A switch 600 is connected in parallel with the switch 520. A moving contact 602 is operated by the actuator 138 from a contact 604 to a contact 606. The moving contact is connected to the line 560. The contact 604 is connected to one terminal of the solenoid valve 248, the other terminal of which is connected to the line 560. The contact 606 is coupled via the vacuum switch 246 to one terminal of the vacuum pump 238, the other terminal of which is connected to the line 560. The program cam 534 is aligned so that the first dwell 436 is adjacent the pin 438, and the correct rotation speed is manually established by the switch 446. The lines 560 and 562 are energized and the motor 470 is energized via the fixed contact 164. When the delay interval ends, the motor 470 is de-energized, and the motor 430 is energized via the fixed contact 568. The pin 438 enters the first notch 436 permitting the biased movable contact 548 to move to the fixed contact 552. The conveyor motor 418 is now energized via the line 562, the movable contact 566, the fixed contact 568, the motor 418, the movable contact 548, the fixed contact 552, the fixed contact 546, the movable contact 542 and the line 560.

The motor 418 drives the cam member 522 ultimately causing the tissue holder 166 to be raised up from one liquid receptacle 46 and to be brought over the next liquid receptacle. The member 522 leaves the cam face portion 532, permitting the movable contacts 542 and 602 to move to the fixed contact 544 and 604, respectively, de-energizing the motor 418 and energizing the solenoid valve before the cover 168 is raised. The motor 430 continues its constant rotation, however, and the notch 436 rides out from under the pin 438, moving the arm 440 counter-clockwise to cause the movable contact 548 to move to the fixed contact 550. The motor 418 is again energized via the line 562, the movable contact 566, the fixed contact 568, the motor 418, the movable contact 548, the fixed contact 550, the fixed contact 544, the movable contact 142 and the line 560.

The motor 418 is energized for a short interval of time after the tissue holder is lowered into the liquid, as the member 522 rapidly moves the operator 526 clockwise to cause the movable contacts 542 and 602 to move to the fixed contacts 546 and 606, respectively, to de-energize the motor and the solenoid switch, and to start the vacuum pump. The motor 418 remains de-energized until a new transfer cycle is started by the next dwell 436 receiving the pin 438. When the processing cycle is over, the pin 468 strikes the arm 514, causing it to shift the pin 438 along the underside of the arm 504 until it is captured by the notch 512. The motor 418 is at that time de-energized between transfer cycles, and the tissue holder 166 is in the paraffin bath. Although the motor 430 remains energized, the apparatus has ended its processing of the tissue and awaits the arrival of the technician.

If it is desired to provide a long interval of time during which atmospheric pressure may be admitted to the system prior to raising the cover 168 from the receptacle 68, then the connection between the switches 444 and 520 may be interchanged so that the contact 550 is connected to the contact 546, and the contact 552 is connected to the contact 544. Then the cycle of operation of the conveyor will be controlled by the rises of the cam 434, rather than by the dwells, and the interval that the solenoid switch is energized prior to the raising of the cover 168 will be longer.

A plurality of barriers 260 are adapted to be interposed between the receptacles 46 in the trough 18 by insertion into projecting pairs of tabs 261. The trough is filled with a suitable fluid for conducting heat to the receptacles, such as water, mineral oil or ethylene glycol; and the barriers serve to divide the trough into independently heat-controllable zones. A plurality of stirrers 262 each has a motor 264 external to and above the trough, a tube 266 which passes through and is sealed to an aperture 268 in the trough, a shaft 270 passing through the tube 266 from the motor into the trough, and a propeller 272 for circulating the heat conducting fluid in the trough. Since the motor is above the fluid level in the trough, the shaft seals need not be pressurized.

A plurality of heaters 274 are each disposed through and sealed to a plurality of apertures 276 respectively in the cover plate 34, and are controlled by a plurality of thermostat probes 278 which are each disposed through and sealed to a plurality of apertures 280 respectively in the cover plates. By this means various groups of the receptacles can be maintained at different temperatures, all above room temperature. The temperature of the receptacles holding the paraffin may be kept at, for example, 56°–60° C., while the other fluids may be kept at, for example, 45°–50° C. The vacuum may, for example be maintained at 17–18 inches of mercury for each receptacle.

I have found that processing tissues having a one millimeter gross thickness for one hour, and two and three millimeters gross thickness for three hours, in an embodiment of this invention provided superior cellular differentiation. Fatty tissues (e.g., breast tissue) was completely processed and gave excellent sections. Similar tissues of three millimeters gross thickness processed in the prior art machines without vacuum and elevated temperature on all fluids, using the customary sixteen hour processing cycle were not satisfactorily processed. The reasons for the unsatisfactory results were: (1) The prolonged fixation curls the tissues, that is, they do not remain flat; and (2) the prolonged dehydration makes the tissues brittle and difficult to cut.

Processing with temperatures and under vacuum provides for a more rapid, thorough, and uniform penetration of the fixation reagents, the dehydration reagents, and the clearing reagents, as well as the molten paraffin. Not only is the length of time necessary to process tissues reduced, but more details of tissue and cellular morphology are obtained by virtue of the short processing periods.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treatting liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; and coupling means coupled to and through said closure means and to said vacuum producing means for alternatively fluid-coupling said vacuum producing means and the atmosphere to that second receptacle into which said first receptacle has been disposed and which has been sealed by said closure means.

2. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means coupled to and through said closure means and to said vacuum producing means for alternatively fluid-coupling said vacuum producing means and the atmosphere to that second receptacle into which said first receptacle has been disposed and which has been sealed by said closure means; and programming means coupled to said closure means and to said coupling means for causing said coupling means to fluid-couple the atmosphere to said closed second receptacle before said closed second receptacle is opened by said closure means.

3. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; and coupling means coupled to and through said closure means and to said vacuum producing means for alternatively fluid-coupling said vacuum producing means and the atmosphere to that second receptacle into which said first receptacle has been disposed and which has been sealed by said closure means; and programming means coupled to said conveyor means and to said coupling means, effective for each said second receptacle in turn, for firstly causing said conveyor means to dispose said first receptacle in the next sequential one of said second receptacles and thus to close that second receptacle with said closure means, for secondly causing said coupling means to fluid-couple said vacuum producing means to that closed second receptacle, for thirdly causing said coupling means to fluid-couple the atmosphere to that closed second receptacle, and for fourthly causing said conveyor means to open that closed second receptacle with said closure means and to remove said first receptacle from that opened second receptacle.

4. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means coupled to and through said closure means and to said vacuum producing means for alternatively fluid-coupling said vacuum producing means and the atmosphere to that second receptacle into which said first receptacle has been disposed and which has been sealed by said closure means; programming means coupled to said conveyor means and to said coupling means, effective for each said second receptacle in turn, for firstly causing said conveyor means to dispose said first receptacle in the next sequential one of said second receptacles and thus to close that second receptacle with said closure means, for secondly causing said coupling means to fluid-couple said vacuum producing means to that closed second receptacle, for thirdly causing said coupling means to fluid-couple the atmosphere to that closed second receptacle, and for fourthly causing said conveyor means to open that closed second receptacle with said closure means and to remove said first receptacle from that opened second receptacle; and oscillator means coupled to said first receptacle for oscillating said first receptacle while said first receptacle is disposed within that closed second receptacle.

5. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means coupled to and through said closure means and to said vacuum producing means for alternatively fluid-coupling said vacuum producing means and the atmosphere to that second receptacle into which said first receptacle has been disposed and which has been sealed by said closure means; each of said second receptacles having a top opening through which said first receptacle is conveyed; said closure means including a cover for closing said top opening of that second receptacle into which said first receptacle is disposed; said conveyor means including a substantially horizontally projecting arm mounted for up and down and for lateral movement; said cover being resiliently mounted to said arm; said first receptacle being fixedly mounted to said arm; and oscillator means coupled to said arm for oscillating said arm and said first receptacle up and down within the limits of the resilient mounting of said cover while said cover covers said top opening of said second receptacle.

6. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means coupled to and through said closure means and to said vacuum producing means for alternatively fluid-coupling said vacuum producing means and the atmosphere to that second receptacle into which said first receptacle has been disposed and which has been sealed by said closure means; programming means coupled to said conveyor means and to said coupling means, effective for each said second receptacle in turn, for firstly causing said conveyor means to dispose said first receptacle in the next sequential one of said second receptacles and thus to close that second receptacle with said closure means, for secondly causing said coupling means to fluid-couple said vacuum producing means to that closed second receptacle, for thirdly causing said coupling means to fluid-couple the atmosphere to the closed second receptacle, and for fourthly causing said conveyor means to open that closed second receptacle with said closure means and to remove said first receptacle from that opened second receptacle; each of said second receptacles having a top opening through which said first receptacle is conveyed; said closure means including a cover for closing said top opening of that second receptacle into which said first receptacle is disposed; said conveyor means including a substantially horizontally projecting arm mounted for up and down and for lateral movement; said cover being resiliently mounted to said arm; said first receptacle being fixedly mounted to said arm; and oscillator means coupled to said arm for oscillating said arm and said first receptacle up and down within the limits of the resilient mounting of said cover while said cover covers said top opening of said second receptacle.

7. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means coupled to and through said closure means and to said vacuum producing means for alternatively fluid-coupling said vacuum producing means and the atmosphere to that second receptacle into which said first receptacle has been disposed and which has been sealed by said closure means; and heat producing means heat coupled to each of said second receptacles for maintaining the treating liquids contained therein at predetermined temperatures.

8. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means coupled to and through said closure means and to said vacuum producing means for alternatively fluid-coupling said vacuum producing means and the atmosphere to that second receptacle into which said first receptacle has been disposed and which has been sealed by said closure means; and heat producing means heat coupled to each of said second receptacles for maintaining the treating liquids contained therein at predetermined temperatures; said heat producing means including a plurality of third receptacles, each said third receptacle containing a group of said plurality of second receptacles, thermostatically controlled heater means, and a heat conveying fluid for heat-coupling said heater means to said group of second receptacles.

9. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means coupled to and through said closure means and to said vacuum producing means for alternatively fluid-coupling said vacuum producing means and the atmosphere to that second receptacle into which said first receptacle has been disposed and which has been sealed by said closure means; and heat producing means heat coupled to each of said second receptacles for maintaining the treating liquids contained therein at predetermined temperatures; said heat producing means including a third receptacle, a plurality of adjustable fluid barriers for dividing said third receptacle into a plurality of fourth receptacles; each said fourth receptacle containing a group of said plurality of second receptacles, thermostatically controlled heater means, and a heat conveying liquid for heat-coupling said heater means to said group of second receptacles.

10. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means for alternatively fluid-coupling said vacuum producing means and the atmosphere to that second receptacle into which said first receptacle has been disposed and which has been closed by said closure means; each of said second receptacles having a top opening through which said first receptacle is conveyed; said closure means including a cover for closing said top opening of that second receptacle into which said first receptacle is disposed; said conveyor means including a mast and a boom fixed thereto, and motive means coupled to said mast for raising and lowering said mast and for rotating said mast about its central axis; elongated mounting means fixedly mounting said first receptacle to said boom; said cover having a central aperture through which said elongated mounting means is disposed, said cover being disposed between said boom and said first receptacle and slidable on said elongated mounting means, the joint between said cover and said elongated mounting means being airtight, biasing means mounted on said conveyor means for biasing said cover downwardly, whereby when said first receptacle is disposed in that second receptacle, the joint between said cover and said second receptacle is airtight; said elongated mounting means having a bore therethrough having one lower end opening below said cover and the other, upper end, coupled to said coupling means.

11. Apparatus for processing histologic tissue for microscopic examination wherein the tissue is immersed seriatim for predetermined periods of time in each of a plurality of treating liquids, comprising: a first perforate receptacle for receiving the tissue; a plurality of second receptacles, each for storing a treating liquid; conveyor means coupled to said first receptacle for disposing said first receptacle seriatim in each of said second receptacles; closure means coupled to said conveyor means for sealing any second receptacle into which said first receptacle has been disposed, after said first receptacle has been disposed therein, and for opening that second receptacle before said first receptacle has been removed therefrom; vacuum producing means; coupling means for alternatively fluid-coupling said vacuum producing means and the atmosphere to that second receptacle into which said first receptacle has been disposed and which has been closed by said closure means; each of said second receptacles having a top opening through which said first receptacle is conveyed; said closure means including a cover for closing said top opening of that second receptacle into which said first receptacle is disposed; said conveyor means including a mast and a boom fixed thereto, and motive means coupled to said mast for raising and lowering said mast and for rotating said mast about its central axis; elongated mounting means fixedly mounting said first receptacle to said boom; said cover having a central aperture through which said elongated mounting means is disposed, said cover being disposed between said boom and said first receptacle and slidable on said elongated mounting means, the joint between said cover and said elongated mounting means being airtight, biasing means mounted on said conveyor means for biasing said cover downwardly, whereby when said first receptacle is disposed in that second receptacle, the joint between said cover and said second receptacle is airtight; said elongated mounting means having a bore therethrough having one lower end opening below said cover; said mast having an axial bore therethrough, the upper end thereof being coupled to said upper end of said bore through said elongated mounting means, a rotary air fitting fixed against rotation with respect to said vacuum producing means and rotatable with respect to said mast coupling the lower end of said bore of said mast to said coupling means.

References Cited
UNITED STATES PATENTS

| | | | |
|---|---|---|---|
| 1,019,048 | 3/1912 | James et al. | 118—50 |
| 1,211,385 | 1/1917 | Bartholomew et al. | 18—429 |
| 2,324,122 | 7/1943 | Weiskopf | 118—425 X |
| 2,872,894 | 2/1959 | Isreeli | 118—425 X |

CHARLES A. WILLMUTH, *Primary Examiner.*

J. P. McINTOSH, *Assistant Examiner.*